(12) United States Patent
Holenarsipur et al.

(10) Patent No.: US 9,971,407 B2
(45) Date of Patent: May 15, 2018

(54) HAPTIC FEEDBACK FOR ROTARY INPUTS

(71) Applicant: Apple Inc., Cupertino, CA (US)

(72) Inventors: Prashanth Holenarsipur, Fremont, CA (US); Albert Wang, Sunnyvale, CA (US); Yuta Kuboyama, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 14/870,697

(22) Filed: Sep. 30, 2015

(65) Prior Publication Data

US 2017/0090572 A1   Mar. 30, 2017

(51) Int. Cl.
*G06F 3/01*   (2006.01)
*G06F 3/0362*   (2013.01)

(52) U.S. Cl.
CPC ............ *G06F 3/016* (2013.01); *G06F 3/0362* (2013.01)

(58) Field of Classification Search
CPC ............................ G06F 2203/014; G06F 3/016
See application file for complete search history.

(56) References Cited

U.S. PATENT DOCUMENTS

| | | |
|---|---|---|
| 4,304,133 A | 12/1981 | Feamster |
| 5,483,261 A | 1/1996 | Yasutake |

(Continued)

FOREIGN PATENT DOCUMENTS

| | | |
|---|---|---|
| CN | 1496549 A | 5/2004 |
| CN | 101231553 A | 7/2008 |

(Continued)

OTHER PUBLICATIONS

Extended European Search Report dated Nov. 25, 2016, for EP Application No. 16171125.4, seven pages.

(Continued)

*Primary Examiner* — Chad Dicke
(74) *Attorney, Agent, or Firm* — Morrison & Foerster LLP

(57) ABSTRACT

An electronic device is disclosed. In some examples, the electronic device comprises a mechanical input configured to rotate in a first direction about a rotation axis in response to a first input at the mechanical input. In some examples, the electronic device comprises a mechanical input sensor coupled to the mechanical input and configured to sense a rotation of the mechanical input about the rotation axis. In some examples, the electronic device comprises a mechanical input actuator coupled to the mechanical input and configured to rotate the mechanical input in a second direction about the rotation axis. In some examples, the mechanical input comprises a shared driving and sensing segment. In some examples, the mechanical input sensor is configured to sense the rotation of the mechanical input at the shared driving and sensing segment. In some examples, the mechanical input actuator is configured to generate magnetic fields for rotating the mechanical input at the shared driving and sensing segment. In some examples, the mechanical input is further configured to translate along the rotation axis in response to a second input. In some examples, the mechanical input actuator comprises at least one piezoelectric element configured to allow the mechanical input to translate along the rotation axis. In some examples, the mechanical input actuator comprises at least one piezoelectric element configured to rotate the mechanical input in the second direction about the rotation axis.

15 Claims, 13 Drawing Sheets

(56) References Cited

U.S. PATENT DOCUMENTS

| | | |
|---|---|---|
| 5,488,204 A | 1/1996 | Mead et al. |
| 5,587,937 A | 12/1996 | Massie et al. |
| 5,709,219 A | 1/1998 | Chen et al. |
| 5,825,352 A | 10/1998 | Bisset et al. |
| 5,835,079 A | 11/1998 | Shieh |
| 5,880,411 A | 3/1999 | Gillespie et al. |
| 6,171,191 B1 | 1/2001 | Ogata et al. |
| 6,188,391 B1 | 2/2001 | Seely et al. |
| 6,211,861 B1 | 4/2001 | Rosenberg et al. |
| 6,257,529 B1 | 7/2001 | Kubo et al. |
| 6,310,610 B1 | 10/2001 | Beaton et al. |
| 6,323,846 B1 | 11/2001 | Westerman et al. |
| 6,394,906 B1 | 5/2002 | Ogata |
| 6,636,197 B1 | 10/2003 | Goldenberg et al. |
| 6,661,438 B1 | 12/2003 | Shiraishi et al. |
| 6,686,911 B1 | 2/2004 | Levin et al. |
| 6,690,387 B2 | 2/2004 | Zimmerman et al. |
| 6,822,635 B2 | 11/2004 | Shahoian et al. |
| 6,956,558 B1 | 10/2005 | Rosenberg et al. |
| 7,015,894 B2 | 3/2006 | Morohoshi |
| 7,184,064 B2 | 2/2007 | Zimmerman et al. |
| 7,450,110 B2 | 11/2008 | Shahoian et al. |
| 7,489,309 B2 | 2/2009 | Levin et al. |
| 7,564,444 B2 | 7/2009 | Rosenberg et al. |
| 7,567,243 B2 | 7/2009 | Hayward |
| 7,663,607 B2 | 2/2010 | Hotelling et al. |
| 8,174,508 B2 | 5/2012 | Sinclair et al. |
| 8,479,122 B2 | 7/2013 | Hotelling et al. |
| 9,535,501 B1 | 1/2017 | Moussette et al. |
| 2003/0103044 A1 | 6/2003 | Takashi et al. |
| 2003/0193475 A1 | 10/2003 | Rosenberg et al. |
| 2004/0032395 A1* | 2/2004 | Goldenberg ............. G05G 1/08 345/156 |
| 2004/0233159 A1* | 11/2004 | Badarneh ................ G06F 3/016 345/156 |
| 2004/0251061 A1 | 12/2004 | Augustine |
| 2006/0187201 A1 | 8/2006 | Rosenberg et al. |
| 2006/0197753 A1 | 9/2006 | Hotelling |
| 2006/0255683 A1* | 11/2006 | Suzuki .................... G05G 1/10 310/317 |
| 2007/0085448 A1* | 4/2007 | Kurosawa ........... H02N 2/0065 310/323.04 |
| 2007/0091063 A1 | 4/2007 | Nakamura et al. |
| 2007/0119698 A1 | 5/2007 | Day |
| 2007/0182708 A1 | 8/2007 | Poupyrev et al. |
| 2007/0236450 A1 | 10/2007 | Colgate et al. |
| 2007/0279401 A1 | 12/2007 | Ramstein et al. |
| 2008/0158149 A1 | 7/2008 | Levin |
| 2008/0238879 A1 | 10/2008 | Jaeger et al. |
| 2011/0141052 A1 | 6/2011 | Bernstein et al. |
| 2012/0032031 A1 | 2/2012 | Grohmann et al. |
| 2012/0249315 A1 | 10/2012 | Vanhelle et al. |
| 2014/0139436 A1 | 5/2014 | Ramstein et al. |
| 2014/0315642 A1 | 10/2014 | Grant et al. |
| 2014/0340372 A1* | 11/2014 | Olsson .................. G06F 3/0338 345/184 |
| 2015/0145657 A1 | 5/2015 | Levesque et al. |
| 2015/0370376 A1 | 12/2015 | Harley et al. |
| 2016/0098016 A1 | 4/2016 | Ely et al. |
| 2016/0171804 A1* | 6/2016 | Chaar ................ G07C 9/00071 340/5.52 |
| 2016/0378187 A1 | 12/2016 | Moussette et al. |
| 2017/0255266 A1 | 9/2017 | Holenarsipur et al. |

FOREIGN PATENT DOCUMENTS

| | | |
|---|---|---|
| CN | 101861561 A | 10/2010 |
| CN | 104024989 A | 9/2014 |
| CN | 104107539 A | 10/2014 |
| JP | 2000-163031 A | 6/2000 |
| JP | 2001-202178 A | 7/2001 |
| JP | 2002-342033 A | 11/2002 |
| JP | 2004-184396 A | 7/2004 |
| JP | 2010-515153 A | 9/2014 |
| JP | 2015-111416 A | 6/2015 |
| WO | WO-03/038800 A1 | 5/2003 |
| WO | WO-2008/085487 A1 | 7/2008 |
| WO | WO-2013/101472 A1 | 7/2013 |
| WO | WO-2014/200766 A1 | 12/2014 |
| WO | WO-2017/152139 A1 | 9/2017 |

OTHER PUBLICATIONS

Final Office Action dated Nov. 4, 2016, for U.S. Appl. No. 14/754,416, filed Jun. 29, 2015, 16 pages.

Notice of Allowance dated Sep. 8, 2016, for U.S. Appl. No. 14/974,606, filed Dec. 18, 2015, five pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

U.S. Appl. No. 14/754,416, filed Jun. 29, 2015.

U.S. Appl. No. 14/796,915, filed Jul. 10, 2015.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Notice of Allowance dated Apr. 19, 2017, for U.S. Appl. No. 14/754,416, filed Jun. 29, 2015, five pages.

Levesque, V. (2000). "Demonstration of Laterotactile Principle," located at http://www.cim.mcgill.ca/~haptic/laterotactile/principle.php, last visited on Jun. 3, 2015, one page.

Non Final Office Action dated May 10, 2016, for U.S. Appl. No. 14/754,416, filed Jun. 29, 2015, 18 pages.

Non Final Office Action dated May 10, 2016, for U.S. Appl. No. 14/974,606, filed Dec. 18, 2015, 18 pages.

Final Office Action dated Dec. 1, 2017, for U.S. Appl. No. 15/449,816, filed Mar. 3, 2017, 24 pages.

Notice of Allowance dated Aug. 2, 2017, for U.S. Appl. No. 14/754,416, filed Jun. 29, 2015, eight pages.

Non Final Office Action dated May 5, 2017, for U.S. Appl. No. 15/449,816, filed Mar. 3, 2017, 19 pages.

\* cited by examiner

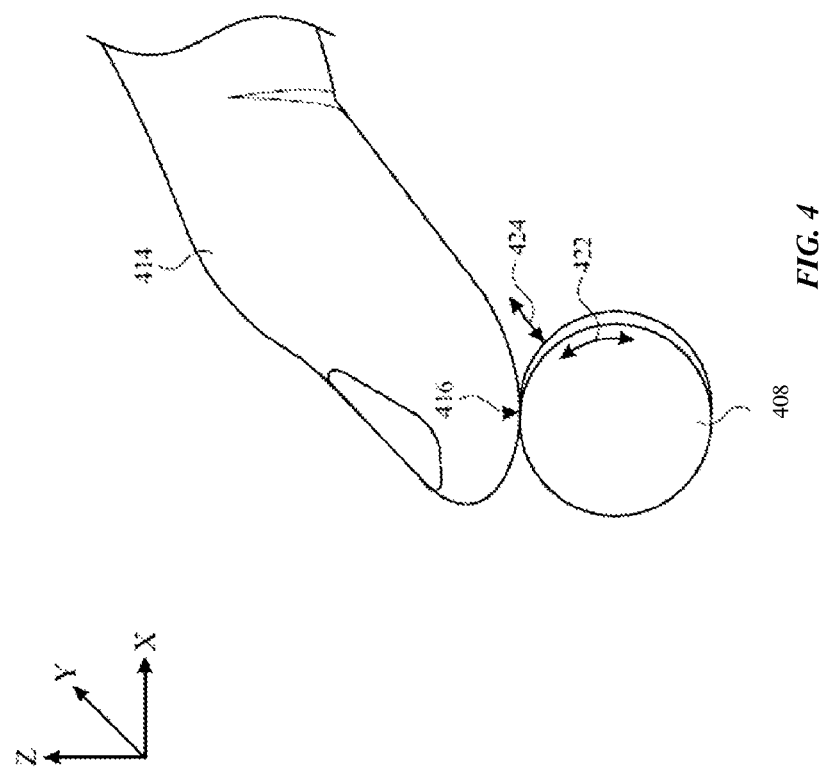

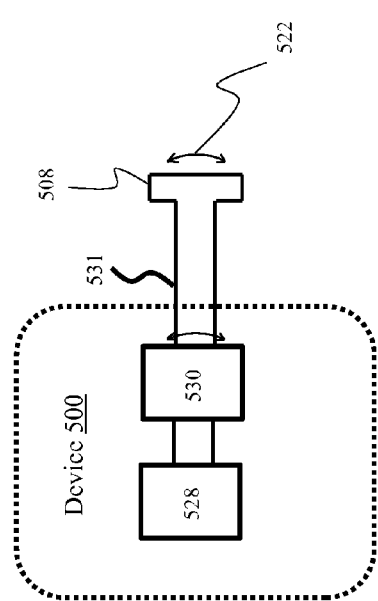
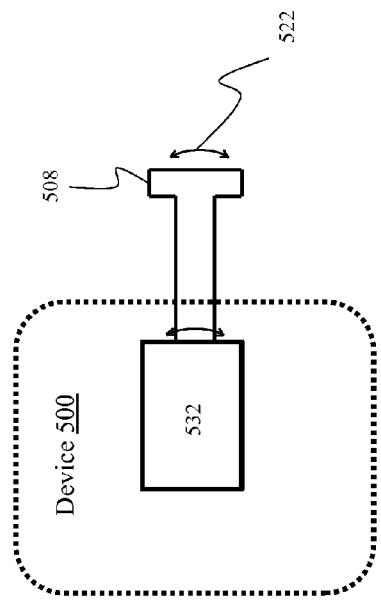

HAPTIC FEEDBACK FOR ROTARY INPUTS

FIELD OF THE DISCLOSURE

This relates generally to user inputs, such as mechanical inputs, and more particularly, to providing haptic feedback on such inputs.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. However, devices that accept non-mechanical inputs, such as capacitive touch input, often do not provide tactile feedback to a user.

In addition to touch panels/touch screens, many electronic devices may also have mechanical inputs, such as buttons, switches, and/or knobs. These mechanical inputs can control power (i.e., on/off) and volume for the electronic devices, among other functions. However, sometimes these mechanical inputs also fail to give a user tactile feedback, such as the "click-click-click" feeling of winding a mechanical watch crown.

SUMMARY OF THE DISCLOSURE

Some electronic devices may include mechanical inputs, such as buttons, switches, and/or knobs. These mechanical inputs can control power (i.e., on/off) and volume for the electronic devices, among other functions. However, sometimes these mechanical inputs can fail to give a user tactile feedback, such as the "click-click-click" feeling of winding a mechanical watch with a knob. It can be beneficial to provide haptic or tactile feedback to a user who is interacting with a mechanical input of an electronic device to give the user a richer interaction experience with the device. Accordingly, examples of the disclosure are directed to providing haptic feedback on mechanical inputs. In some examples, such haptic feedback can constitute giving the user a sensation that the user's finger is moving over a ridge, bump or valley feature on an otherwise smooth surface. This type of sensation can simulate the feeling of the user rotating a mechanical knob against the teeth of an internal gear (e.g., the feeling of a detent when turning a rotary input, such as the "click-click-click" feeling of winding a mechanical watch). In some examples, such as when a user is rotating a mechanical knob, haptic feedback can constitute giving the user a sensation of increased or decreased resistance to rotation of the mechanical knob. Haptic feedback as described above can give the user feedback about the effect of the user's input on the electronic device, such as changing the zoom-scale of content displayed on the device in response to the user's rotary input. In some examples, the above haptic feedback can be provided to the user via rotational displacement of a mechanical input that is opposite to the direction of the rotational movement of the mechanical input provided by the user (e.g., counter rotation of a rotary input that is opposite to the rotary input's rotational movement). Various examples of the above are provided in the disclosure.

BRIEF DESCRIPTION OF THE DRAWINGS

FIG. 4 illustrates an exemplary finger interacting with a protruding rotary input according to examples of the disclosure.

FIGS. 5A-5C illustrate exemplary devices including a mechanical input sensor and mechanical input actuator for providing haptic feedback and finger-on-crown detection according to examples of the disclosure.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

Figure 1:
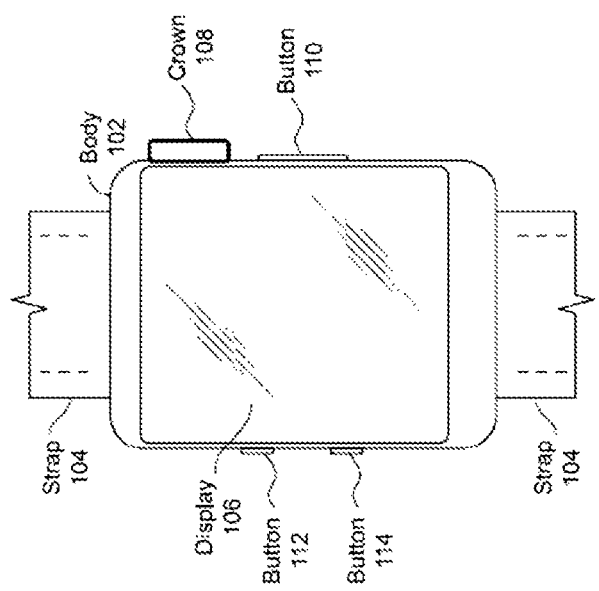
FIG. 1 shows an exemplary device in which the haptic feedback of the disclosure can be implemented according to examples of the disclosure.

FIG. 1 illustrates exemplary personal electronic device 100 in which the haptic feedback of the disclosure can be implemented according to examples of the disclosure. In the illustrated example, device 100 is a watch that generally includes body 102 and strap 104 for affixing device 100 to the body of a user. That is, device 100 is wearable. Body 102 can be designed to couple to straps 104. Device 100 can have touch-sensitive display screen 106 (hereafter touchscreen) and crown 108. Device 100 can also have buttons 110, 112, and 114. Though device 100 is illustrated as being a watch, it is understood that the examples of the disclosure can be implemented in devices other than watches, such as tablet computers, mobile phones, or any other wearable or non-wearable electronic device that can include a rotary input such as a crown 108 and/or a rotating bezel (not shown).

Conventionally, the term 'crown,' in the context of a watch, can refer to the cap atop a stem or shaft for winding the watch. In the context of a personal electronic device 100, the crown can be a physical component of the electronic device, rather than a virtual crown on a touch sensitive display. Crown 108 can be mechanical, meaning that it can be connected to a sensor for converting physical movement of the crown into electrical signals. Crown 108 can rotate in two directions of rotation (e.g., forward and backward, or clockwise and counter-clockwise). Crown 108 can also be pushed in towards the body 102 of device 100 and/or be pulled away from the device. Crown 108 can be touch-sensitive, for example, using capacitive touch technologies or other suitable technologies that can detect whether a user is touching the crown. Moreover, crown 108 can further be configured to tilt in one or more directions or slide along a track at least partially around a perimeter of body 102. In some examples, more than one crown 108 can be included in device 100. The visual appearance of crown 108 can, but need not, resemble crowns of conventional watches. Buttons 110, 112, and 114, if included, can each be a physical or a touch-sensitive button. That is, the buttons may be, for example, physical buttons or capacitive buttons. Further, body 102, which can include a bezel, may have predetermined regions on the bezel that act as buttons. In some examples, body 102 can include a rotating bezel (not shown) that can be positioned around a perimeter of display 106, and can be rotated around the perimeter by a user. In some examples, the visual appearance of rotating bezel can, but need not, resemble rotating bezels in conventional watches. In some examples, the rotating bezel can be configured to perform analogous input operations and behaviors as the crown 108 (i.e., rotation in two directions of rotation, pushing toward and/or pulling away from the device, etc.). In some examples, other rotating input configurations can be used analogously as mechanical inputs to device 100.

Display 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 106 can allow a user to perform various functions by touching or hovering near the touch sensor panel using one or more fingers or other objects.

In some examples, device 100 can further include one or more pressure sensors (not shown) for detecting an amount of force or pressure applied to the display 106. The amount of force or pressure applied to display 106 can be used as an input to device 100 to perform any desired operation, such as making a selection, entering or exiting a menu, causing the display of additional options/actions, or the like. In some examples, different operations can be performed based on the amount of force or pressure being applied to display 106. The one or more pressure sensors can further be used to determine a position of the force that is being applied to display 106.

Figure 2:
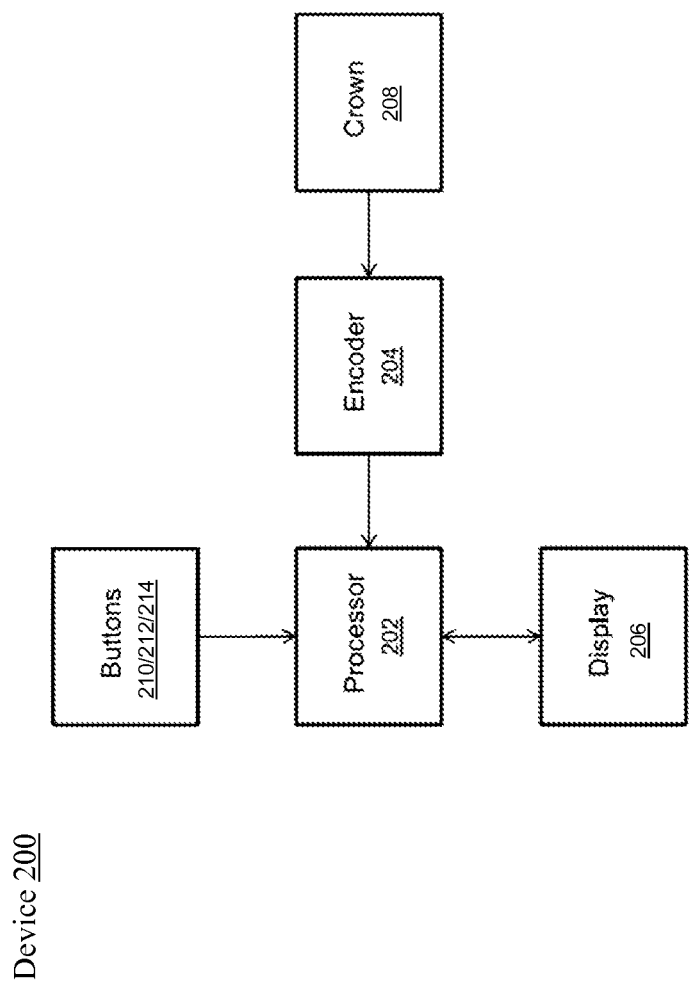
FIG. 2 illustrates a block diagram of components within an exemplary device according to examples of the disclosure.

FIG. 2 illustrates an exemplary block diagram of components within an exemplary device 200 according to examples of the disclosure. In some examples, crown 208 (which can correspond to crown 108 described above) can be coupled to encoder 204, which can be configured to monitor a physical state or change of physical state of the crown (e.g., the position and/or rotational state of the crown), convert it to an electrical signal (e.g., convert it to an analog or digital signal representation of the position or change in position of the crown), and provide the signal to processor 202. For instance, in some examples, encoder 204 can be configured to sense the absolute rotational position (e.g., an angle between 0-360°) of crown 208 and output an analog or digital representation of this position to processor 202. Alternatively, in other examples, encoder 204 can be configured to sense a change in rotational position (e.g., a change in rotational angle) of crown 208 over some sampling period and to output an analog or digital representation of the sensed change to processor 202. In these examples, the crown position information can further indicate a direction of rotation of the crown 208 (e.g., a positive value can correspond to one direction and a negative value can correspond to the other). In yet other examples, encoder 204 can be configured to detect a rotation of crown 208 in any desired manner (e.g., velocity, acceleration, or the like) and can provide the crown rotational information to processor 202. The rotational velocity can be expressed in numerous ways. For example, the rotational velocity can be expressed as a direction and a speed of rotation, such as hertz, as rotations per unit of time, as rotations per frame, as revolutions per unit of time, as revolutions per frame, as a change in angle per unit of time, and the like. In alternative examples, instead of providing information to processor 202, this information can be provided to other components of device 200, such as, for example, a state machine. While the examples described herein refer to the use of rotational position of crown 208 to control scrolling or scaling of a view, it should be appreciated that any other physical state of the crown can be used to control appropriate actions.

In some examples, the state of the display 206 (which can correspond to display 106 described above) can control physical attributes of crown 208. For example, if display 206 shows a cursor at the end of a scrollable list, crown 208 can have limited motion (e.g. cannot be rotated forward). In other words, the physical attributes of the crown 208 can be conformed to a state of a user interface that is displayed on display 206. The mechanisms for controlling the physical attributes of the crown are described in further detail below. In some examples, a temporal attribute of the physical state of crown 208 can be used as an input to device 200. For example, a fast change in physical state can be interpreted differently than a slow change in physical state. These temporal attributes can also be used as inputs to control physical attributes of the crown.

Processor 202 can be further coupled to receive input signals from buttons 210, 212, and 214 (which can correspond to buttons 110, 112, and 114, respectively), along with touch signals from touch-sensitive display 206. Processor 202 can be configured to interpret these input signals and output appropriate display signals to cause an image to be produced by touch-sensitive display 206. While a single processor 202 is shown, it should be appreciated that any number of processors or other computational devices can be used to perform the functions described above.

Figure 3:
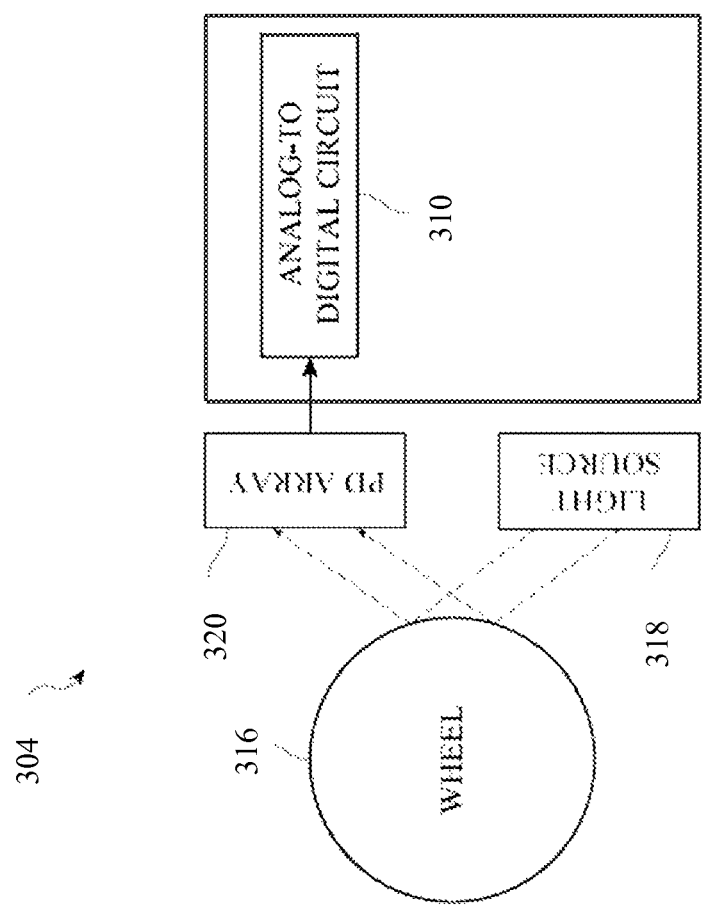
FIG. 3 illustrates a diagram of various components of an optical encoder that may be used to receive crown position information according examples of the disclosure.

FIG. 3 illustrates an exemplary block diagram of various components of an optical encoder 304 that can be used to receive crown position information according to examples of the disclosure. The optical encoder 304 shown in FIG. 3 may correspond to the encoder 204 described above, or may be used in conjunction with the encoder 204 described above. In various electronic devices, rotational and/or axial movement of a component (e.g., a crown) of the electronic device may need to be determined. In such instances, an optical encoder 304 may be used to detect the rotational movement and the axial movement of the component. For example, an optical encoder 304 according to examples of the disclosure can include a light source 318 that shines on a wheel 316 (also referred to as an encoder wheel) or a shaft of the optical encoder. The wheel 316 (or shaft) may include an encoding pattern, such as, for example, a collection of light and dark lines that are arranged in a particular sequence or in a particular pattern. In some examples, the wheel 316 may be integrated with or attached by a shaft to the crown 108 described above.

When light from the light source 318 hits the encoding pattern, the encoding pattern can modulate the light and reflect it onto one or more sensors 320 associated with the optical encoder. In certain embodiments, the one or more sensors 320 may be an array of photodiodes (PD). As light from the light source 318 is reflected off the wheel 316, one or more photodiodes of the photodiode array 320 can produce a voltage measurement associated with an amount of light received at a given sample time. Once the light is received by the photodiode array 320 at a given time period, an analog-to-digital circuit 310 can convert the analog signal received from the photodiode array to a digital signal. The corresponding digital signals can be processed, and a determination may be made as to the direction, speed and/or movement (rotational and/or axial) of the wheel. In some examples, the direction and/or speed of the rotation information can be used in combination with the haptic feedback mechanisms described in the disclosure to improve interactivity of the user experience. For example, as the user rotates the crown, the haptic feedback circuit can provide a small counter-rotation in the opposite direction. This counter rotation can provide the user with a "click-click-click" feeling of winding a mechanical watch, for example.

FIG. 4 illustrates an exemplary finger 414 interacting with a protruding rotary input 408 according to examples of the disclosure. FIG. 4 depicts an exemplary rotary input 408 (which can correspond to crown 108 and/or a rotating bezel above) that can rotate in rotational direction 422 as well as be displaced in direction 424, i.e. translated along the direction of the rotation axis toward and/or away from a device (e.g., device 100 above), according to examples of the disclosure. In some examples, it can be beneficial to provide haptic or tactile feedback to a user who is interacting with a device (e.g., providing a mechanical input to the device), to give the user a richer interaction experience with the device. Finger 414 can be resting on rotary input 408, and can be providing rotational input to the rotary input in rotational direction 422. In addition to being able to rotate in rotational direction 422, rotary 408 input can also have the ability to be displaced along direction 424, (corresponding to movement along the y-axis in FIG. 4), orthogonal to rotational direction 422 and the movement of finger 414. In some examples, displacement or translation along direction 424 can be used to activate a translational input (e.g. pushing the rotary input inward along direction 424 can behave as a button input). In some examples, the translational input can be activated when a translational input component is compressed. In some examples, rotary input 408 can be displaced by an actuator in rotational direction 422 in a direction opposite to the rotational input provided by finger 414. Examples of these actuators and their operation are described in further detail below. The displacement of rotary input in the rotational direction opposite to the direction of the finger movement can cause stretching and/or compression of portion 416 of finger 414 that is touching rotary input 408, and can simulate the feeling of a ridge or detent (e.g., the clicking of a rotary input) associated with the rotary input. In some examples, limiting the displacement of rotary input 408 along the rotational direction 422 to be a relatively small displacement (e.g., 15 degrees or less) can be most effective in simulating the above ridges or detents. In some examples, providing the displacement of rotary input 408 along the rotational direction 422 for a relatively short duration (e.g., 100 milliseconds or less) can be most effective in simulating the above ridges or detents. The speed, duration, strength, density and any other characteristic of the displacement of rotary input 408 along rotational direction 422 can be adjusted dynamically to provide a range of haptic feedback to the user, from continuous texture-like sensations to individual clicks or ridges on the rotary input to no haptic feedback at all to allow a smooth rotation of the rotary input. Alternatively, rotation of rotary input 408 can be resisted, for example by providing a sustained displacement opposite to the rotational direction 422 being provided by the user that is proportional to the amount of force being input by the user. In some examples rotation of the rotary input 408 can be resisted by increasing the amount of friction resisting rotation of the rotary input, as will be described in further detail below. In some examples, rotation of the rotary input 408 can instead be assisted, for example, by providing a displacement in the same rotational direction 422 being provided by the user. In some examples, a rotation can be initiated by the user, and the rotation can be continued in the same rotational direction 422 without the user providing additional rotation. In some examples, the continued displacement can be stopped when the user provides an additional input to the rotary input (e.g. a tap).

Figure 5C:
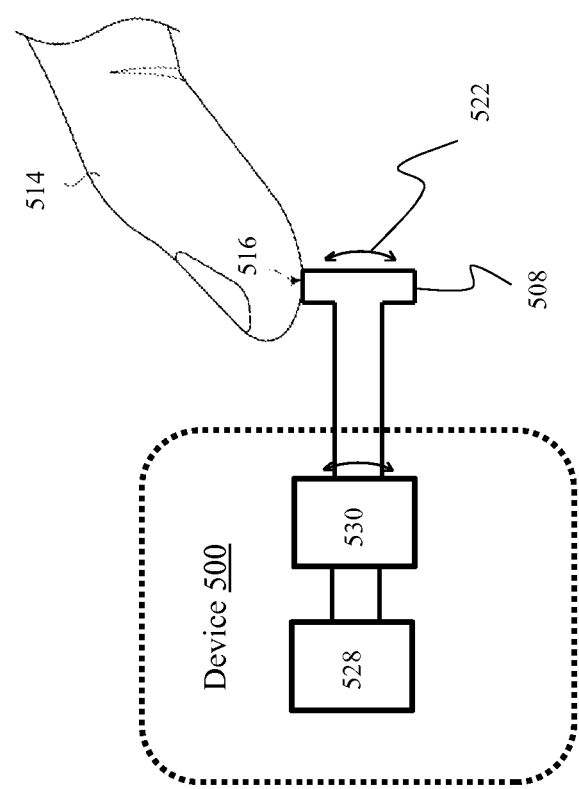

FIGS. 5A-5C illustrate exemplary devices 500 including a mechanical input sensor 528 and mechanical input actuator 530 (or a combined mechanical input sensor and actuator 532) for providing haptic feedback according to examples of the disclosure. Mechanical input sensor 528 can be coupled to rotary input 508 (which can correspond to crown 108 in FIG. 1 and/or a rotating bezel described above) and can sense the rotational movement of the rotary input along rotational direction 522. In some examples, rotary input 508 can be coupled to mechanical input actuator 530 by shaft 531. Mechanical input actuator 530 can be coupled to shaft 531 and can provide displacement of the shaft and thus rotary input 508, along rotational direction 522. In some examples, mechanical input actuator 530 can be coupled directly to mechanical input 508 and/or coupled to other components that can be mechanically attached to the mechanical input. Mechanical input actuator 530 can be in communication with mechanical input sensor 528 such that the mechanical input actuator can have access to the input information provided by rotation of rotary input 508. Mechanical input actuator 530 and/or mechanical input sensor 528 can be programmable such that any number of characteristics of the displacement of rotary input 508 along rotational direction 522 can be adjusted. For example, the amplitude of the displacement, the duration of the displacement, the frequency of the displacement (e.g., every 30 degrees of rotation), the velocity of the displacement, and any other characteristic of the displacement can be dynamically varied to provide the desired user experience on device 500. In some examples, a clockwise rotation can be considered a positive amount of rotation and a counter-clockwise rotation can be considered a negative amount of rotation. To simulate a "click" at rotary input 508, for example, if a threshold amount of rotation (e.g. every 30 degrees) is exceeded, counter-rotation can be induced in a clockwise direction, while if it is determined that the amount of rotation exceeds the threshold amount of rotation in the positive direction, the counter-rotation can be induced in a counter-clockwise direction.

In some examples, the characteristics of the displacement of rotary input 508 along rotational direction 522 by mechanical input actuator 530 can be based on the context of device 500. For example, if device 500 is displaying a mapping application, rotary input 508 can be used to zoom into and out of a displayed map. In such circumstances, mechanical input actuator 530 can provide a counter-rotation of rotary input 508 along rotational direction 522 each time the scale of the map is changed in response to the rotational input of the rotary input (e.g., switching from a five-mile scale to a one-mile scale), so as to simulate a click of the rotary input (e.g., a detent) and to provide the user haptic feedback that the scale of the map has been changed. In another example, when the scale of the map has reached the maximum or minimum zoom level available, resistance can be applied to rotation of the rotary input 508 to notify the user that additional rotation in a particular direction will have no additional effect. In another example, the mechanical input actuator 530 can assist or maintain a rotation after receiving a user input. For example, if device 500 is displaying a word processing application, rotary input 508 can be used to scroll through a document. In such circumstances, mechanical input actuator 530 can provide an assisting rotation along rotational direction 522 to facilitate easier scrolling through large documents. In one example, the mechanical input actuator can provide a rotation in the same direction as the user input rotation (e.g., every 30 degrees) to reduce the amount of effort a user must provide to continuously rotate the rotary input 508. In other examples, the user can provide a rapid input (i.e., 180 degrees in 0.1 seconds), and the rapid input can trigger the mechanical input actuator 530 to provide a continuous rotation to the rotary input 508, which can maintain the scrolling action initiated by the user. In some examples, the rotation provided by the mechanical input actuator 530 can be halted by an additional user input, such as a user tapping the crown or resisting the mechanical input actuator's rotation.

As another example, if device 500 is running and displaying a timing application, rotary input 508 can be used to set the duration of a timer. In such circumstances, mechanical input actuator 530 can provide counter-rotation of rotary input 508 along rotational direction 522 each time the duration of the timer is changed by a predetermined amount (e.g., every minute, every five minutes, etc.) in response to the rotational input of the rotary input, so as to simulate a click of the rotary input (e.g., a detent) and to provide the user haptic feedback indicating that the duration of the timer has been changed by a predetermined amount. Other circumstances in which the characteristics of the displacement of rotary input 508 along rotational direction 522 can be based on the context of device 500 (e.g., the current state of the device, what application(s) are running on the device, what user interface(s) are being displayed on the device, etc.) are similarly within the scope of the disclosure.

FIG. 5B illustrates an exemplary device 500 in which the mechanical input sensor 528 and mechanical input actuator 530 can be combined into a single mechanical input sensor and actuator 532 for providing haptic feedback according to examples of the disclosure. While the examples below may be explained in terms of a separate mechanical input sensor 528 and mechanical input actuator 530, the same or similar principles can be applied if the mechanical input sensor and mechanical input actuator are combined in the mechanical input sensor and actuator 532. Alternatively, mechanical input sensor 528 and mechanical input actuator 530 can be connected to one or more processors (not shown) responsible for coordinating their operation.

FIG. 5C illustrates an exemplary device 500 for detecting a user contact with rotary input 508 according to examples of the disclosure. Device 500 can receive rotary user input from a finger 514 at a contact point 516 on rotary input 508. In some examples, the mechanical input sensor 528 can be used along with the mechanical input actuator 530 to detect whether a user is in contact with the rotary input 508. While a finger 514 in contact with the rotary input 508 may appear to be stationary in a position on the rotary input, small movements of the finger that can be imperceptible to the human eye may cause the finger to generate corresponding small movements in the rotary input. These small movements can be the result of constant adjustments in the human body motor control system required for stabilization. The movements can also be viewed as small natural oscillations in body position or position of extremities such as fingers. These movements can be referred to as micro-tremors. The micro-tremors can in some examples cause very small back and forth rotation of the crown. In some examples, the micro-tremors can cause small movements of the crown in any direction that the rotary input 508 is free to move, including the directions of movement (e.g., movement in and out, tilting, or sliding) described with respect to FIG. 1 above. Although in some examples these micro-tremors are imperceptible to the human eye, the corresponding movement in the rotary input 508 caused by the micro-tremors can be perceptible to the mechanical input sensor 528. In some examples, if the mechanical input sensor 528 detects a micro-tremor indicative of contact by a user's finger 514, the mechanical input sensor can indicate a finger-on-crown condition (e.g., the device 500 can determine that a finger is in contact with rotary input 508). In some examples, the finger-on-crown condition can be indicated if the detected micro-tremor creates an oscillation with a frequency between 10 Hz and 20 Hz. In other examples, a wider frequency range can be used that can account for a larger range of natural oscillation frequency for different users. In yet other examples, calibration can be performed to detect the natural oscillation characteristics of a particular user. In some examples, this calibration can be completed by detecting movement in the rotary input 508 when the user's finger is in contact with the crown and storing the detected movement (e.g. a movement pattern, amplitude, and/or frequency). The mechanical input sensor 528 can be configured to compare movement in the rotary input 508 with the stored movement pattern and determine whether the detected micro-tremor falls within a matching threshold of the stored movement (e.g., the movement pattern, amplitude, and/or frequency). If the result of the comparison is within the matching threshold, the mechanical input sensor 528 can associate the micro-tremor with the user. This can prevent erroneous finger-on-crown indications, or in some examples can be used to identify that a particular user is contacting the crown.

In some examples, the finger-on-crown detection described above can be enhanced by the exemplary configuration of device 500 in FIG. 5C. Specifically, in some circumstances, a user's micro-tremor may not create a detectable corresponding movement in the rotary input 508 due, for example, to assembly and manufacturing tolerances. For example, the rotary input 508 can be seated in a device's housing such that the crown experiences a relatively high amount of friction that resists movement of the crown, and the user's micro tremor may not generate sufficient force to cause sufficient motion (e.g. rotation, movement in and out, tilt, sliding, etc.) in a resting crown to be detected by the mechanical input sensor 528. In some examples, the mechanical input actuator 530 can be used to enhance the above described finger-on-crown detection capability. In some examples, the user's micro-tremor can be detectable without enhancement, but the mechanical input actuator 530 can still be used to enhance the above described finger-on-crown detection capability. In some examples, a micro-oscillation can be induced in the crown 508 by the mechanical input actuator 530. In some examples, the micro-oscillation (e.g. an oscillating micro-rotation) can occur with an amplitude that is imperceptible to the human eye, while being detectable by the mechanical input sensor 528. In some examples, the micro-oscillations can cause small movements of the crown in any direction that the rotary input 508 is free to move, including the directions of movement (e.g., rotation, movement in and out, tilting, or sliding) described regarding FIG. 1 above. In some examples, the micro-oscillation can be induced at a frequency between 10 Hz and 20 Hz. In other examples, the micro-oscillation can be induced to match a user-specific frequency detected during a calibration operation. In some examples, any frequency of oscillation within a range reasonably expected to correspond with a natural human oscillation can be induced in the crown. In some examples, the mechanical input actuator 530 can rotate the rotary input 508 at a desired frequency of oscillation with sufficient rotational force to generate an amount of rotation in the crown that is detectable by the mechanical input sensor 528. In some instances, depending on manufacturing tolerances as described above, the mechanical input actuator 530 can apply a greater amount of force than the natural oscillations of a typical user to overcome a relatively high amount of friction in the rotary input 508, while in other examples the mechanical input actuator can rotate the crown with only a relatively low amount of force compared to the natural oscillations of a typical user. In some examples, the micro-oscillation can be applied continuously by the mechanical input actuator 530, while in other examples the micro-oscillation can be applied periodically to conserve power. In other examples, the micro-oscillation can be applied in response to a command from an application running on device 500 requesting finger-on-crown information.

The micro-oscillations applied to the rotary input 508 by the mechanical input actuator 530 described above can enhance finger-on-crown detection capability when a user's finger comes in contact with the crown. Since the applied micro-oscillation can be applied at a frequency similar to a user's natural oscillation frequency, in some examples the two oscillations (e.g. the micro-oscillation and the micro-tremor) can constructively or destructively interfere. The mechanical input sensor 528 can be configured to detect constructive or destructive interference to detect a finger-on-crown condition. In some examples, constructive interference can lead to an increase of the amplitude of oscillation detected by mechanical input sensor 528 and destructive interference can lead to a decrease of the amplitude of oscillation detected by mechanical input sensor. Such constructive or destructive interference can be partial or complete, or can be detected as a heterodyning of the two oscillation frequencies. Therefore, in some examples, the mechanical input sensor 528 can indicate a finger-on-crown condition if the amplitude of oscillation detected by the mechanical input sensor falls below and/or goes above a specified threshold of the induced micro-oscillations (e.g., 25% higher or lower than the induced micro-oscillation amplitude). In some examples, the frequency of the mechanical input actuator 530 induced micro-oscillation can be viewed as a local oscillator frequency. In other examples, while the micro-oscillation may be consciously imperceptible to the user, a resonance may be formed between the user's micro-tremor and the induced oscillation. In some examples, the resonance can result in a dramatic increase in the amplitude of oscillation of rotary input 508 at a resonance frequency. In some examples the resonance can be considered an extreme case of constructive interference. This resonance can also be detected as an amplitude of oscillation above a certain threshold by the mechanical input sensor 528 to indicate a finger-on-crown condition.

Figure 6A:
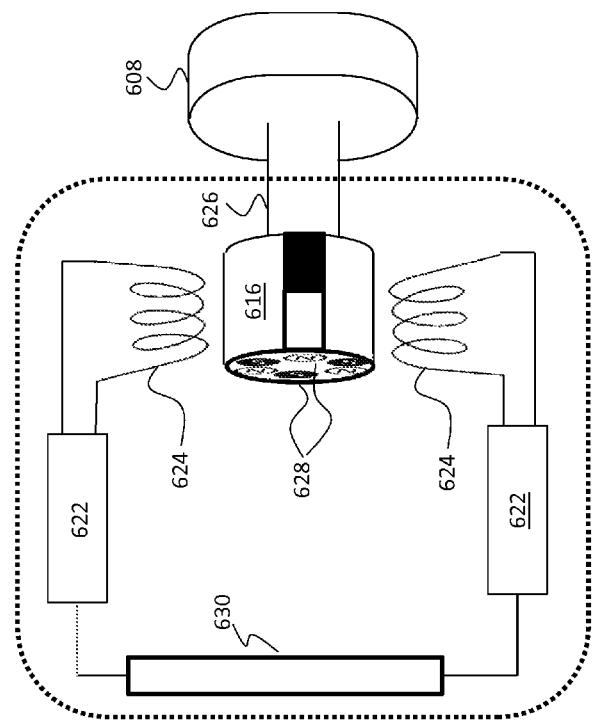
FIGS. 6A-6C illustrate an exemplary DC motor haptic feedback configuration for providing haptic feedback according to examples of the disclosure.

FIG. 6A illustrates a perspective view of an exemplary DC motor haptic feedback configuration for providing haptic feedback to a rotatable shaft 626 according to examples of the disclosure. In some examples, the rotatable shaft 626 can be attached to a crown 608 and a rotor 616. The shaft 626 can pass through a housing (not shown) of a portable electronic device, connecting the crown 608 on the outside of the device to the rotor 616 on the inside of the device. In some examples, magnets 628 (e.g., permanent magnets) can be embedded within the rotor 616. The permanent magnet 628 poles can be arranged to form an alternating pattern of north and south pole magnetic fields emanating from around the perimeter of the rotor 616. In this configuration, the rotor 616 can behave analogously to a rotor in a brushless direct current (DC) motor configuration. In other examples, the rotor 616 can be configures as a squirrel cage rotor, or any other suitable rotor configuration based on available space, power budget, interference with other device components, and the like. In the squirrel cage configuration, the permanent magnets 628 can be replaced by metal bars that are not permanent magnets. The squirrel cage rotor can behave analogously to a rotor in an induction motor configuration.

In some examples, wire coils 624, which can also be referred to as drive coils, can be arranged at least partially surrounding the rotor 616. The wire coils 624 can be formed from a large number of closely spaced turns of wire. The wire coils 624 can be connected to coil drivers 622. The coil drivers 622 and wire coils 624 can form the stator of the haptic feedback configuration. In some examples, the coil drivers 622 can be DC to DC converters that drive currents through the wire coils of the stator. When an electrical current flows through a wire coil, a magnetic field can be formed, with magnetic field lines passing through the center of the coil. The magnetic field lines formed in the wire coils 624 can generate torques by interacting with permanent magnetic fields in the permanent magnets 628 or induced magnetic fields in a squirrel cage rotor. The magnetic field can interact with a net magnetic vector of the rotor 616 to provide a variety of types of haptic feedback as described in the disclosure, such as various rotations or counter-rotations of the rotor 616, and thus the crown 608. The magnetic polarity of the field lines generated in wire coils 624 can be dependent on the direction of current flow through each wire coil. The haptic feedback configuration can include controller 630 for controlling the direction and/or amount of current driven through each of the wire coils 624 by the coil drivers 622. The coil drivers 622 can cause an electric current to flow through one coil at a time, or multiple coils simultaneously in the same or different directions. In some examples, the direction of current flow, and hence the polarity of the magnetic field, can be individually controlled for each wire coil 624 and each coil driver 622. In some examples, the drive scheme can be implemented as a pre-determined sequence of drive signals, which can in turn provide a pre-determined sequence of torques for rotating the rotor 616. Utilizing any of the above techniques, the controller can be configured to generate interactions between the magnetic fields generated in the wire coils 624 and the magnetic fields present or induced in the rotor 616 that result in haptic feedback to a user. In some examples, the rotor can correspond to the wheel 316 described above. In other examples, the wheel 316 can correspond to only a portion of the rotor 616, or the wheel can be included in a separate portion of the crown 608 assembly. The components depicted in FIG. 6A can provide rotational and/or resistive forces to the rotor and position sensing that can facilitate providing haptic feedback according to examples of the disclosure. In some examples (not shown), magnets 628 can be embedded within a rotor 616 coupled to and/or included within a rotating bezel as described above. In some examples, wire coils 624 can be arranged to interact with magnets in the rotating bezel to provide rotational and/or resistive forces to the rotor in analogous fashion to one or more of the examples illustrated in FIG. 6A.

Figure 6B:
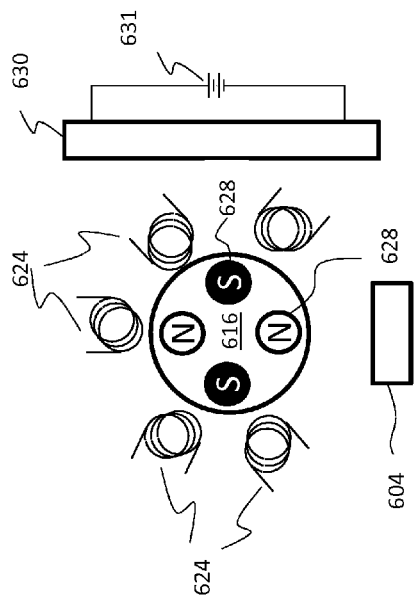
Figure 6C:
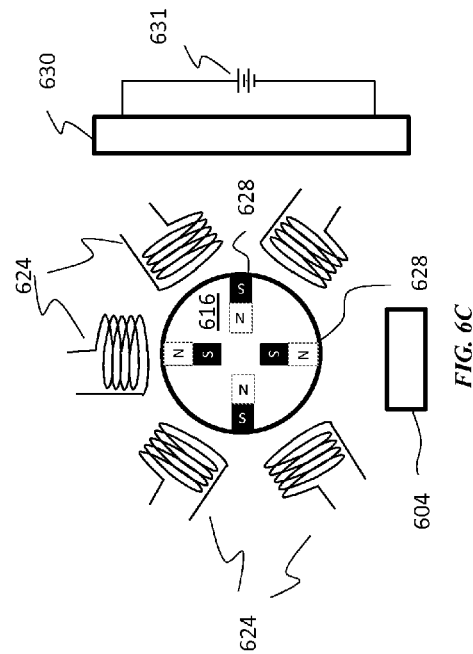

FIGS. 6B and 6C illustrate two of the many possible variations of permanent magnet 628 and wire coil 624 placements that can be used in an implementation of the haptic feedback configuration of FIG. 6A. While the illustrations of FIGS. 6B and 6C depict four permanent magnets embedded within the rotor 616, a rotor having as few as one permanent magnet or more than four permanent magnets can be used without departing from the scope of this disclosure. Similarly, while FIGS. 6B and 6C illustrate five wire coils 624 surrounding the rotor, it is understood that more or fewer wire coils can be used.

FIG. 6B illustrates an exemplary configuration for providing haptic feedback where the permanent magnets 628 extend through the rotor 616 along the direction of the axis of rotation of the rotor according to examples of the disclosure. The permanent magnets 628 can be arranged with alternating polarity of north and south poles. The wire coils 624 can be arranged around the perimeter of the rotor with the coils also extending along the direction of the axis of rotation of the rotor. In this configuration, the magnetic fields induced by driving current through a wire coil 624 can interact with both the north and south magnetic poles of the permanent magnet simultaneously. For simplicity of illustration, no wiring connections or coil drivers (e.g., 622 in FIG. 6A) are shown between the controller 630 and the wire coils 624. In some examples, the coil drivers 622 and the controller 630 can be integrated into a single drive control circuit for controlling and driving the wire coils 624. DC power source 631 can be a supply voltage converted by the coil drivers into drive voltages for the wire coils 624. Sensor 604 can be used to detection the absolute or relative rotation of rotor 616 and can correspond to encoder 204, optical encoder 304, mechanical input sensor 528, or any other position sensor described above. In one example where sensor 604 is an optical encoder, a gap in the wire coils 624 can be provided between the sensor and the rotor 616, allowing the sensor to detect an encoding pattern that can be included on the rotor (e.g. an encoder wheel) as described above to determine the position of rotor 616. In some examples, the rotor 616 can be considered a shared driving and sensing segment of a rotary input (e.g., crown 608 and/or a rotating bezel as described above) that can be used for sensing the rotation of the rotary input and for being driven by the stator. The components depicted in FIG. 6B can provide rotational and/or resistive forces to the rotor and position sensing that can facilitate providing haptic feedback according to examples of the disclosure.

FIG. 6C illustrates an additional exemplary configuration where the permanent magnets 628 each extend radially outward from the rotation axis to the perimeter of the rotor 616 according to examples of the disclosure. The magnets 628 can be arranged to provide alternating polarity of north and south poles around the perimeter of the rotor 616. In this configuration, the wire coils 624 can be arranged around the perimeter of the rotor 616 with the coils extending along the radial axis of the rotor. In this configuration, electromagnetic fields induced in the wire coils 624 can interact relatively strongly with the pole of each permanent magnet that is closer to the perimeter of the rotor 616, while the opposite pole buried within the rotor can have relatively minimal interaction with the electromagnetic fields. Again, for simplicity, no wiring connections or coil drivers (e.g., 622 in FIG. 6A) are shown between the controller 630 and the wire coils 624. In some examples, the coil drivers and the controller 630 can be integrated into a single drive control circuit for controlling and driving the wire coils 624. DC power source 631 can be a supply voltage converted by the coil drivers 622 into drive voltages for the wire coils 624. Sensor 604 can have the same properties as described in connection with FIG. 6A above. In one example where sensor 604 is an optical encoder, a gap in the wire coils 624 can be provided between the sensor and the rotor 616, allowing the sensor to detect an encoding pattern that can be included on the rotor (e.g. an encoder wheel) as described above to determine the position of rotor 616. The components depicted in FIG. 6C can provide rotational and/or resistive forces to the rotor and position sensing that can facilitate providing haptic feedback according to examples of the disclosure.

Figure 7A:
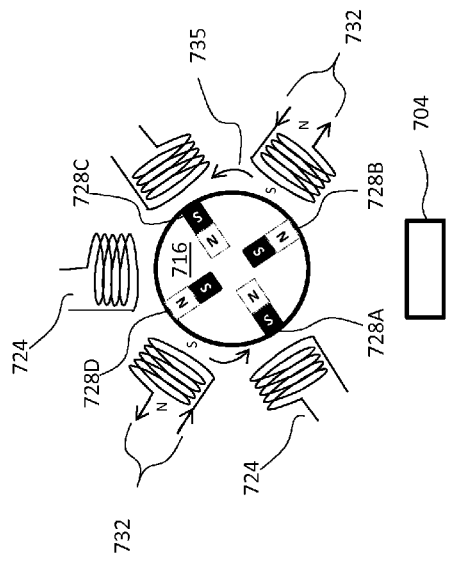
FIGS. 7A-7C illustrate various examples of magnetic drive implementations for providing haptic feedback according to examples of the disclosure.
Figure 7B:
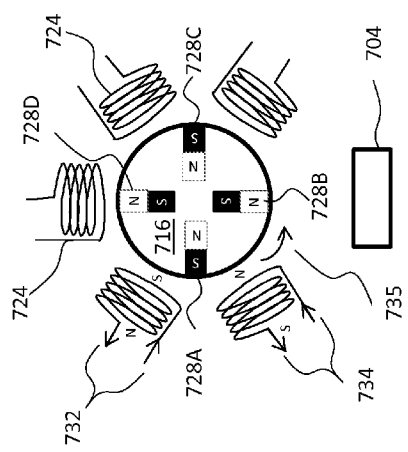
Figure 7C:
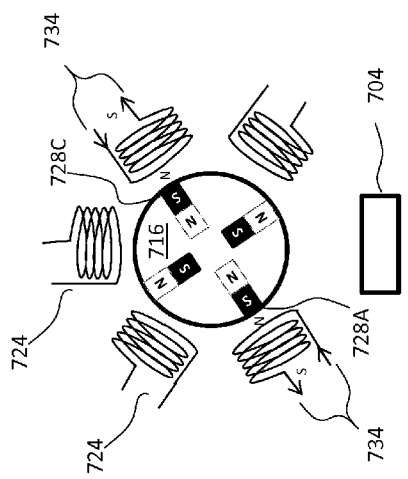

FIGS. 7A-7C illustrate exemplary control sequences for causing the rotor 716 (which can correspond to rotor 616 above) to rotate or for resisting rotation of the rotor for providing haptic feedback according to examples of the disclosure. In FIG. 7A, the permanent magnets 728A-728D are aligned in an initial orientation, with south poles of permanent magnets 728A and 728C facing toward the rotor 716 surface and located approximately mid-way between successive wire coils 724 (which can correspond to wire coils 624 above). Wire coils 724 can correspond to wire coils 624 and permanent magnets 728A-728D can correspond to permanent magnets 628 described above. To reduce the complexity of FIGS. 7A-7C, elements from FIG. 6A including controller 630 and coil drivers 622 have been omitted and wiring connections between the omitted elements and wire coils 724 have also been omitted. It is understood that the initial alignment state of rotor 716 can correspond to any orientation of the rotor, and the initial state presented in FIG. 7A is for illustrative purposes. Alignment of the rotor 716 at any time can be influenced by user interactions with the crown (not shown). On one side of permanent magnet 728A, current can be driven in a first direction 732 in a first wire coil 724 to establish a south pole near the rotor 716 perimeter, which can repel the south pole of permanent magnet 728A. On the other side of the magnetic south pole of permanent magnet 728A, current can be driven in the opposite direction 734 in the wire coil 724 to establish a north pole near the rotor 716, which can attract the south pole of permanent magnet 728A. The net force vector formed by the interactions between the permanent magnetic field of magnet 728A and the induced magnet fields in the wire coils 724 can drive the rotor 716 in the counter-clockwise direction as denoted by direction arrow 735. The coil drive arrangement can be assisted by a position sensor 704 capable of detecting the rotational position of the rotor 716. Position sensor 704 can correspond to sensor 604 described above. As described above regarding FIGS. 6A-6C, the sensor 704 can be an optical position sensor, hall-effect sensor, or any other sensor capable of detecting relative or absolute rotation of the rotor 716. In some examples, the rotor 716 may include an encoding pattern, such as, for example, a collection of light and dark lines that are arranged in a particular sequence or in a particular pattern. In some examples, the location of at least some of the light lines or the dark lines can be configured to coincide with a position of the permanent magnets. In some examples, the location of the permanent magnets within the rotor 716 can be indicated by a special pattern, such as a thicker white line or dark line. In other examples, the position sensor 704 can be a hall-effect sensor that can detect the magnetic fields emanating from the permanent magnets in order to detect the rotation of the rotor 716. The position sensor 704 can provide information about the alignment of the permanent magnets 728 relative to the wire coils 724. This information can aid a controller (e.g. one or more processors, a state machine, etc.) in performing calculations for accurately calculating drive sequences (or drive patterns) that will result in the expected net force vector for providing rotation of rotor 716 with the desired amount of force in the desired direction. The position sensor 704 can be particularly useful when both a user and the magnetic drive configuration are simultaneously acting upon the rotor 716, since a controller can potentially be capable of predicting the amount of motion due to the magnetic drive, but would not be able to reliably predict an arbitrary user input.

In some examples where limited space may be available for a haptic feedback system, one wire coil 724 can be omitted between the position sensor 704 and the rotor 716. In this example, the rotor 716 can include the encoder pattern described above (e.g., to perform the function of wheel 316) while also performing the rotor 716 function (e.g., rotating in response to a force) in the haptic feedback system. By integrating two separate functions into the rotor 716, space can be conserved relative to providing separate hardware components for a rotor 716 and an encoder wheel (e.g., wheel 316). In some examples, the drive sequences applied to the wire coils 724 can be modified to compensate for the omitted wire coil 724.

FIG. 7B shows the rotor 716 at a second point in time, after being driven by the first field configuration and experiencing rotation along direction 735. As shown, south poles of permanent magnets 728A and 728C can become approximately aligned with the centers of the nearest respective wire coils 724. At the same time, north poles of permanent magnets 728B and 728D can be slightly out of alignment with the nearest respective wire coils. In this example, currents in a first direction 732 can be driven in to two wire coils 724, establishing magnetic south poles near the rotor 716 and attracting north poles 728B and 728D. In this configuration, the net force vector formed by the interaction between the permanent magnetic field of the magnets 728B and 728D with magnetic fields in the driven coils 724 can move the rotor 716 in the counter-clockwise direction as denoted by direction arrow 735. It should be noted that the example of FIG. 7A utilizes both attracting and repelling forces while the example in FIG. 7B utilizes two attracting forces to drive the rotor 716 in the same, counter-clockwise direction. A continuous rotation can be achieved by sequentially varying the driven wire coil(s) 724 and direction(s) of current to drive the rotor 716. Alternatively, the coil drive sequence can be used to provide a small counter rotation to an externally applied rotation input, for example a rotation input from a user. The position sensor 704 can perform similar functions as described above regarding FIG. 7A.

It should be understood that simultaneously driving multiple wire coils is not required to generate rotation of the rotor. However, a rotation driven by multiple wire coils 724 can be used to generate a greater amount of torque in the rotor 716. The particular selection of the rotation drive scheme can vary based on the space available for multiple coils in the stator, limitations of the rotor such as the number of magnets, the power budget available for providing haptic feedback, and the like.

FIG. 7C illustrates a configuration for resisting rotation of the rotor 716 to provide different types of haptic feedback. The position of the rotor 716 depicted in FIG. 7C can be identical to the initial position of the rotor described in FIG. 7B. However, the controller (e.g., 630 in FIG. 6A) can be used to provide different drive signals on the wire coils 724 to produce a different result. In this configuration, the two wire coils 724 nearest permanent magnets 728A and 728C can be driven with currents in direction 734 to provide a relatively strong attractive force with south poles of permanent magnets 728A and 728C, which can be well-aligned with the centers of the adjacent wire coils 724. The magnetic fields generated in the wire coils 724 can have the greatest magnitude along the central axis of the coils, thus providing a strong attraction between the induced magnetic field and the permanent magnetic fields in the rotor 716. Depending on the strength of the magnetic attraction, this drive configuration can give a user the sensation of a small resistance to turning, or can provide a large resistance that is difficult for the user to overcome. The position sensor 704 can perform similar functions as described above regarding FIG. 7A.

Figure 8:
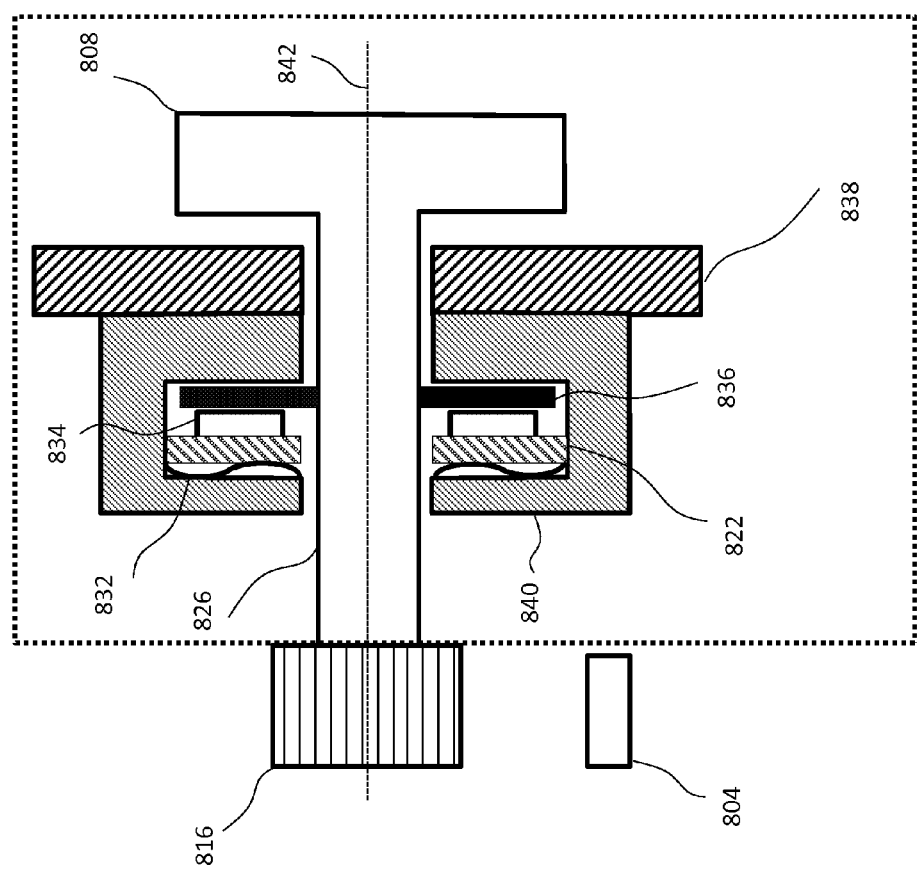
FIG. 8 illustrates an exemplary piezoelectric haptic feedback configuration for providing haptic feedback according to examples of the disclosure.

FIG. 8 illustrates an additional example of a piezoelectric haptic feedback configuration for providing haptic feedback according to examples of the disclosure. FIG. 8 depicts an exemplary cross-section through the center of a shaft 826 which can connect crown 808 with encoder wheel 816 (which can correspond to wheel 316 above). The shaft 826 can pass through an opening in housing 838 of the electronic device (which can correspond to device 100 or 500 above). Housing 838 can be attached to a mount 840 and the shaft 826 can pass through the center of the mount. A rotor disc 836 can be fixed to the shaft 826, and the disc can be sized to fit within a central cavity of the mount 840. The rotor disc 836 can rotate axially around a central axis 842 of the shaft 826 and can also move in either direction (e.g. in and out) along the rotation axis 842 of the shaft 826. The rotor disc 836 can be moved along with the shaft when user input is applied to the crown 808. In some examples, the rotor disc 836 can be incorporated within and/or coupled to a rotating bezel as described above. In addition, a piezoelectric wave motor can be used to induce motion in the rotor disc 836. The piezoelectric wave motor can include a stator disc 822 and a piezoelectric disc made up of piezoelectric elements 834. The stator disc 822 can include electrodes used to drive an electric potential (e.g. a voltage) onto one or more of the piezoelectric elements 834. Piezoelectric elements 834 can include one or more piezoelectric layers. Upon application of the electric potential to piezoelectric elements 834, the piezoelectric layers in individual piezoelectric elements 834 can expand or contract, causing some or all of the piezoelectric elements 834 to contact the rotor disc 836. The expansions and contractions of individual elements can be controlled by a controller attached to the stator, and this controller can be used to generate rotation of the shaft 826 and/or rotating bezel or to resist rotation of the shaft and/or rotating bezel as desired, as will be described in more detail below. Spring 832 can be included behind the stator disc 822 within the central cavity of mount 840 to provide a backing force to the stator disc. In some examples, when a user presses the rotor disc against the stator disc, the stator disc can flex, and the spring 832 can compress while providing the backing force to the stator disc. In another example, the mount 840 can provide the backing force for the stator disc 822. However, since the stator disc 822 may include electrodes on its surface, it can be important that the mount 840 or the spring 832 does not create electrical contacts between the electrodes that are potentially exposed. In some examples, compression of spring 832 can be used to detect a translational input on the crown 808. For example, compression of spring 832 can activate a switch, and in some examples, the spring can be a component of the switch.

Figure 9:
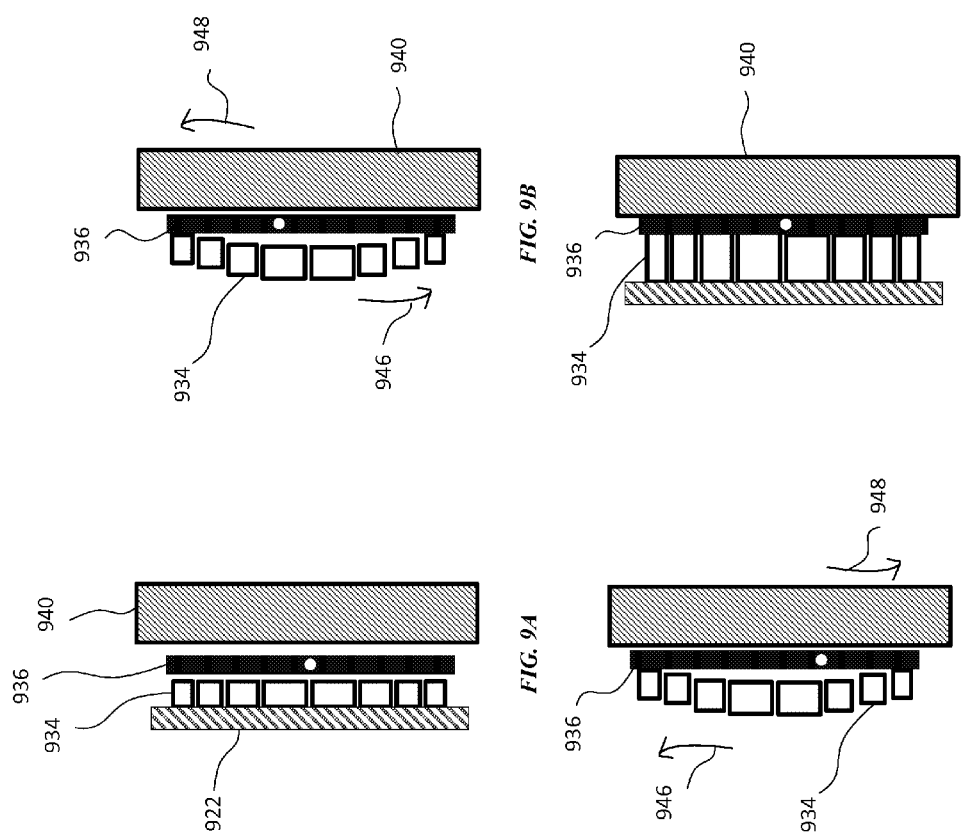
FIGS. 9A-9D illustrate various examples of a piezoelectric implementations for providing haptic feedback according to examples of the disclosure.

FIGS. 9A-9D illustrate various examples of piezoelectric element 934 activation for controlling motion of the rotor disc 936 (which can correspond to rotor disc 836 above) for providing haptic feedback according to examples of the disclosure. FIG. 9A illustrates a condition where the piezoelectric elements 934 (which can correspond to piezoelectric elements 834 above) are driven by electrodes on stator disc 922 (which can correspond to stator disc 822 above) such that the piezoelectric elements are all in a contracted position. In this condition, the rotor disc 936 can be allowed to freely rotate within the cavity of the mount 940 (which can correspond to mount 840 above), for example the rotor disc 936 can freely rotate when a user provides a mechanical force to the crown 908 (which can correspond to crown 808 above), causing the shaft 926 (which can correspond to shaft 926 above) to rotate.

FIGS. 9B and 9C depict examples of piezoelectric element 934 activation for generating a rotational movement of the rotor disc 936 for providing haptic feedback according to examples of the disclosure. For simplicity of illustration, the stator disc 922 is omitted from the illustrations. It should be recognized that appropriate electrical connections must be provided for application of drive signals for piezoelectric element 934 activation. By controlling the voltage applied to individual piezoelectric elements 934 selectively causing some elements to expand, and some elements to contract, a travelling wave can be established at the piezoelectric elements. Piezoelectric elements 934 at the peak of the travelling wave can contact the rotor disc 936, and through friction between the piezoelectric elements and the rotor disc, the piezoelectric elements can apply a rotational force to the rotor disc. The peaks of the piezoelectric elements 934 can be controlled to generate a travelling wave in direction 946. With each element successively generating a small amount of frictional force against the rotor disc 936, the travelling wave can generate a rotor disc rotation in the opposite direction 948. Typically, the rate of rotation of the rotor disc 936 in direction 948 can be slower than the rate of propagation of the travelling wave in the direction 946. The rate of rotation of the rotor disc 936 can depend at least in part on the force of the contact between the piezoelectric elements 934 and the rotor disc. As a result, for a particular traveling wave velocity in direction 946, the rotor disc 936 may rotate at different rates in direction 948 depending on the relative orientation of the mount 940 and rotor disc due to the effects of gravity (e.g., when a device containing the piezoelectric haptic feedback configuration is turned on its side). Accordingly, different traveling wave velocities can be applied for different orientations of a device to achieve a constant rotation velocity for every orientation. The forces provided by the piezoelectric elements described above can be used to provide haptic feedback according to examples of the disclosure.

FIG. 9C illustrates that by changing the control sequence of voltage applied to the piezoelectric elements 934 the travelling wave direction 946 can be reversed, thus causing rotor disc 936 rotation in the opposite direction 948 from FIG. 9B. While the examples of FIGS. 9B and 9C depict piezoelectric elements 934 directly contacting the rotor disc 936, it should be noted that alternative configurations would be acceptable as long as sufficient force can be transferred from the traveling wave into the rotor disc. For example, an interface layer (not shown) can be placed between the piezoelectric elements 934 and the rotor disc 936. In some examples, the interface layer can be made of an insulating material, such as elastic. A suitable material can provide adequate friction with the rotor disc 936 for efficient energy transfer, while protecting the surfaces of the piezo electric elements 934 and the rotor disc. The insulating material can also allow for the use of an electrically conductive rotor disc 936 by preventing contact between the piezo electric elements 934 or stator electrodes (not shown) and metal in the housing or the rotor disc.

FIG. 9D illustrates a piezoelectric element 934 activation condition for resisting rotation of the rotor disc 936 according to examples of the disclosure. By statically applying a voltage to some or all of the piezoelectric elements 934, the rotor disc 936 can be pressed against the mount 940 such that a large frictional force can be created. The greater the amount of force provided by the piezoelectric elements 934, the more resistance a user can experience while trying to rotate the crown (not shown). Thus, this configuration can be used either to slow rotation relative to the free rotation illustrated in FIG. 9A, or with sufficient force can prevent rotation of the crown by the user entirely. In practice, the amount of force applied to the rotor disc 936 could be limited to remain under a maximum force threshold to prevent damage to the device due to attempts by a user to overcome the applied resistance. The resistance to rotation described above is another type of force that can be used to provide haptic feedback according to examples of the disclosure.

Figure 10:
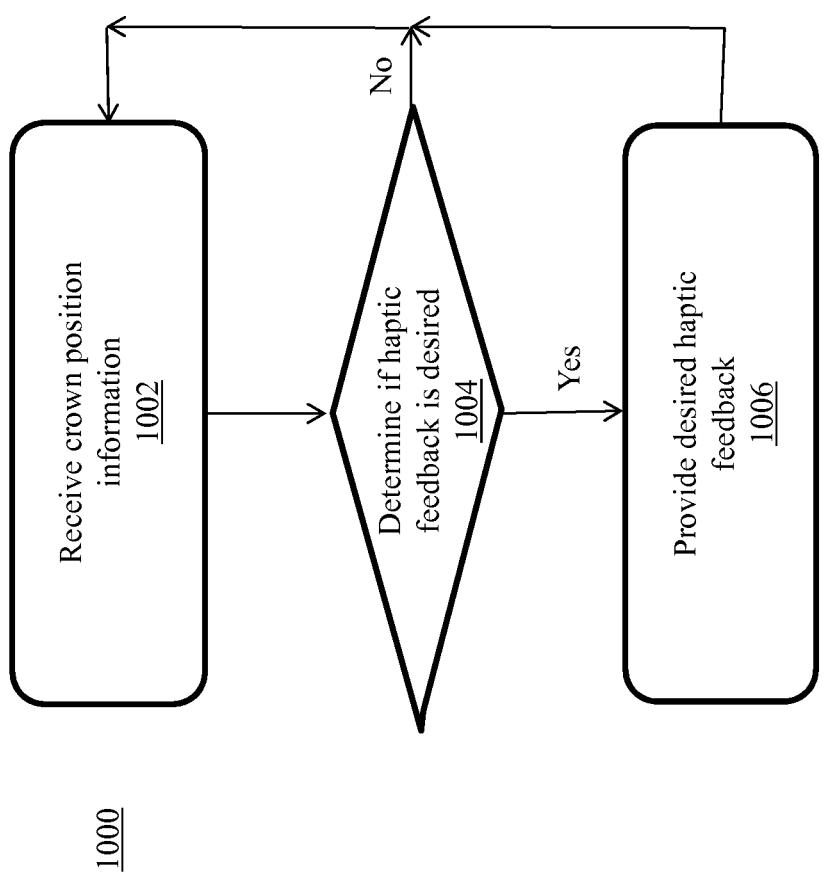
FIG. 10 illustrates an example process for implementing haptic feedback according to examples of the disclosure.

FIG. 10 depicts an exemplary process 1000 for providing haptic feedback according to examples of the disclosure. It should be noted that any of the example actuator configurations described above, or any number of variations of or alternatives to the actuator configurations described above that are capable of controllably generating motion of a shaft, rotor, or the like could be suitable for implementing process 1000. At step 1002, process 1000 can receive crown (e.g. crown 108) position information, such as an amount and a direction of rotation. In some examples, the received crown position information can correspond to an amount of crown rotation performed by a user. At step 1004, process 1000 can determine if haptic feedback is desired in one or more of the manners described in this disclosure. In some examples it can be determined that a haptic feedback is desired when an input is received based on a state of a display (e.g. when display 206 shows a cursor at the end of a scrollable list as described above). In other examples, it can be determined that haptic feedback is desired when a specific type, direction and/or amount of movement is detected by a position sensor (e.g. 30 degrees of rotation of crown 508 detected in a particular direction by mechanical input sensor 528 as described above). At step 1006, haptic feedback can be induced in the crown, which can be felt by a user, in one or more of the manners described in this disclosure. In some examples, the haptic feedback can simulate the "click-click-click" of a mechanical watch according to examples of the disclosure. In other examples, the haptic feedback can be used to assist rotation or resist rotation of a crown according to examples of the disclosure. Once step 1006 is completed and haptic feedback is applied, the process 1000 can return to step 1002. In some examples, if at step 1004 it is detected that haptic feedback is not desired, the process 1000 can return to step 1002.

Figure 11:
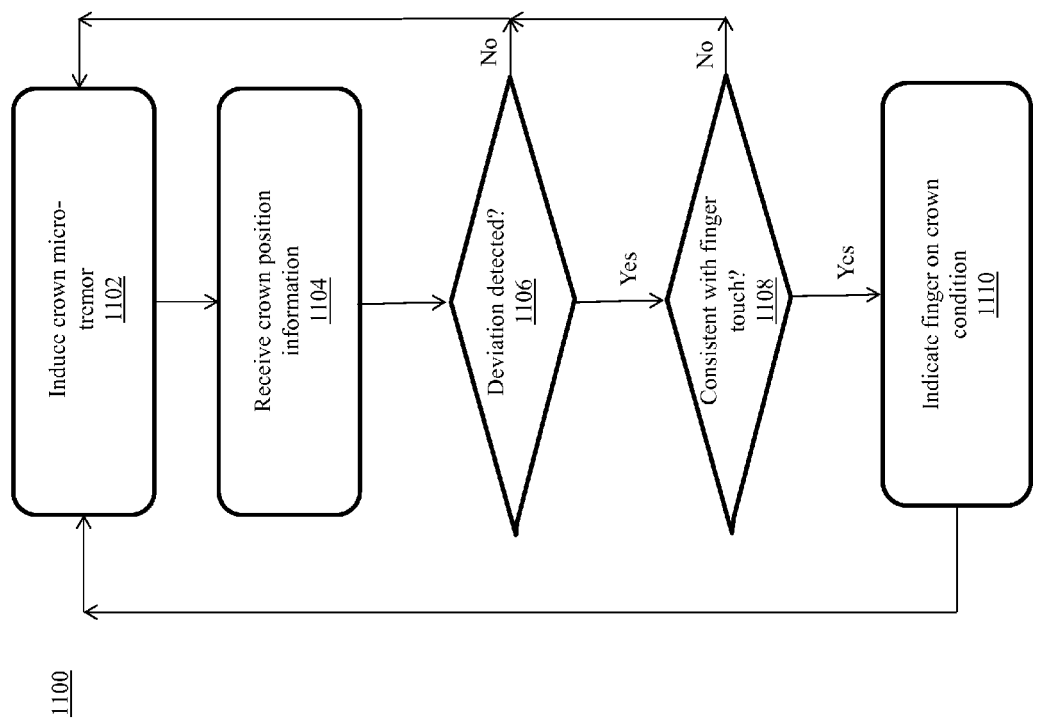
FIG. 11 illustrates an example process for implementing finger-on-crown detection according to examples of the disclosure.

FIG. 11 depicts an exemplary process 1100 for performing finger-on-crown detection according to examples of the disclosure. It should be noted that any of the example actuator configurations described above, or any number of variations of or alternatives to the actuator configurations described above that are capable of controllably inducing a micro-tremor in a rotary input, could be suitable for implementing process 1100. At step 1102, process 1100 can induce a micro-tremor in a rotary input (e.g. a shaft), which can in turn induce the micro-tremor in a crown coupled to the shaft. At step 1104, process 1100 can receive crown position information (e.g. from mechanical input sensor 528, or other position sensors described above), such as an amount and a direction of rotation of the crown. The received crown position information can correspond to a characteristic data pattern consistent with the movement of the crown induced in the crown by the micro-tremor when the crown is not in contact with a user or otherwise experiencing resistance to rotation. However, contact with the crown by an object or a user can interfere with the crown's motion, and alter the received crown position information such that it deviates from the characteristic data pattern. At step 1106, process 1100 can determine whether the received crown information is consistent with the characteristic data pattern induced by the micro-tremor. If it is determined that the received crown position information deviates from the characteristic data pattern, process 1100 can proceed to step 1108. In some examples, process 1100 can proceed to step 1108 only when an amount of deviation from the characteristic data pattern exceeds a threshold amount of deviation (e.g., a deviation of 25%). At step 1108, process 1100 can determine whether the detected deviation is consistent with a finger in contact with the crown. For example, if the detected deviation is consistent with an oscillation at a natural human oscillation frequency interacting with the micro-tremor, the process 1100 can proceed to step 1110. It should be recognized that many types of deviations may be detected at step 1106, and that an assessment of whether a deviation is consistent with a finger in contact with the crown can potentially be determined from a variety of different types of deviation (e.g., constructive interference, destructive interference, or resonance described above). A person of ordinary skill in the art will understand that such variations are within the scope of the disclosure. At step 1110, the process 1100 can indicate a finger-on-crown condition, and then process 1100 can return to step 1102. If at step 1106 it is determined that the received crown position information does not deviate from the characteristic data pattern, the process 1100 can return to step 1102. If at step 1108 it is determined that the detected deviation is not consistent with a finger in contact with the crown, the process 1100 can return to step 1102. In some examples, there may be a deviation from a characteristic data pattern of the micro-tremor that does not indicate a finger-on-crown condition. In some examples, if the deviation does not indicate a finger-on-crown condition, step 1108 can indicate that a deviation occurred that was not consistent with a finger-on-crown condition, and then process 1100 can return to step 1102.

In some examples, step 1102 can be omitted (e.g., to perform non-assisted finger-on-crown detection, as described above with reference to FIG. 5C), and process 1100 can begin at step 1104. At step 1104, process 1100 can receive crown position information, such as an amount and a direction of rotation. In this example, the characteristic data pattern could be considered to be a pattern of received crown position information indicative of no movement. Thus, any detected rotation can be a deviation from the expected movement. In some examples, steps 1106 and 1108 can be combined such that any detected rotation can be analyzed to determine whether the detected rotation is consistent with a finger-on-crown condition.

Figure 12:
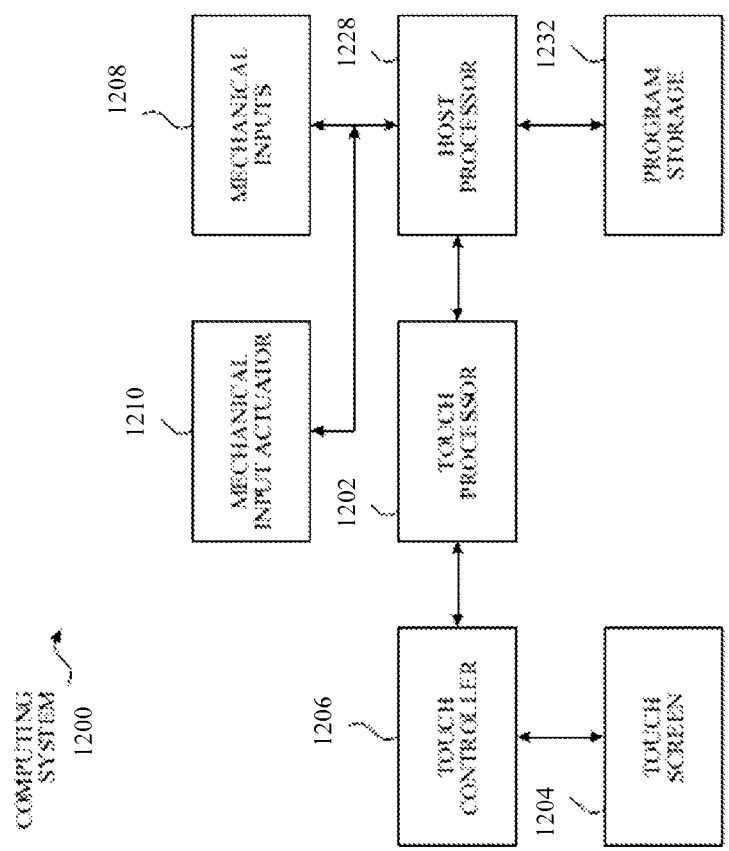
FIG. 12 illustrates an example computing system for implementing haptic feedback according to examples of the disclosure.

FIG. 12 illustrates an example computing system 1200 for implementing haptic feedback according to examples of the disclosure. Computing system 1200 can be included in, for example, device 100 above or any mobile or non-mobile computing device and/or wearable or non-wearable device that includes a rotary input (e.g., rotary input 508 described above). Computing system 1200 can include a touch sensing system including one or more touch processors 1202, touch controller 1206 and touch screen 1204. Touch screen 1204 can be a touch screen adapted to sense touch inputs, as described in the disclosure. Touch controller 1206 can include circuitry and/or logic configured to sense touch inputs on touch screen 1204. In some examples, touch controller 1206 and touch processor 1202 can be integrated into a single application specific integrated circuit (ASIC).

Computing system 1200 can also include host processor 1228 for receiving outputs from touch processor 1202 and performing actions based on the outputs. Host processor 1228 can be connected to program storage 1232. For example, host processor 1228 can contribute to generating an image on touch screen 1204 (e.g., by controlling a display controller to display an image of a user interface (UI) on the touch screen), and can use touch processor 1202 and touch controller 1206 to detect one or more touches on or near touch screen 1204. Host processor 1228 can also contribute to sensing and/or processing mechanical inputs 1208 (which can correspond to rotary input 508 described above), and controlling mechanical input actuator 1210 (which can correspond to mechanical input actuator 530 above), as described in the disclosure. The inputs from touch screen 1204 and/or mechanical inputs 1208 can be used by computer programs stored in program storage 1232 to perform actions in response to the touch and/or mechanical inputs. For example, touch inputs can be used by computer programs stored in program storage 1232 to perform actions that can include moving an object such as a cursor or pointer, scrolling or panning, adjusting control settings, opening a file or document, viewing a menu, making a selection, executing instructions, operating a peripheral device connected to the host device, answering a telephone call, placing a telephone call, and other actions that can be performed in response to touch inputs. Mechanical inputs 1208 can be used by computer programs stored in program storage 1232 to perform actions that can include changing a volume level, locking the touch screen, turning on the touch screen, taking a picture, and other actions that can be performed in response to mechanical inputs. Host processor 1228 can cause rotation of mechanical inputs 1208 by mechanical input actuator 1210 (which can correspond to mechanical input actuator 530) based on the mechanical inputs and/or the context of computing system 1200 (e.g., what application(s) are running on the computing system, what user interface(s) are displayed by the computing system, etc.), as previously described. Host processor 1228 can also perform additional functions that may not be related to touch and/or mechanical input processing.

Note that one or more of the functions described above can be performed by firmware stored in memory in computing system 1200 and executed by touch processor 1202, or stored in program storage 1232 and executed by host processor 1228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Therefore, according to the above, some examples of the disclosure are directed to an electronic device comprising: a mechanical input configured to rotate in a first direction about a rotation axis in response to a first input at the mechanical input; a mechanical input sensor coupled to the mechanical input and configured to sense a rotation of the mechanical input about the rotation axis; and a mechanical input actuator coupled to the mechanical input and configured to rotate the mechanical input in a second direction about the rotation axis. Additionally or alternatively to one or more of the examples disclosed above, in some examples, the mechanical input comprises a shared driving and sensing segment, the mechanical input sensor is configured to sense the rotation of the mechanical input at the shared driving and sensing segment, and the mechanical input actuator is configured to generate magnetic fields for rotating the mechanical input at the shared driving and sensing segment. Additionally or alternatively to one or more of the examples disclosed above, in some examples, the shared driving and sensing segment includes at least one magnet. Additionally or alternatively to one or more of the examples disclosed above, in some examples, the mechanical input actuator includes a gap, wherein sensing the rotation of the mechanical input at the shared driving and sensing segment occurs through the gap. Additionally or alternatively to one or more of the examples disclosed above, in some examples, the gap included in the mechanical input actuator is a gap in a drive coil arrangement disposed around the shared driving and sensing segment. Additionally or alternatively to one or more of the examples disclosed above, in some examples, a drive pattern for generating magnetic fields in the electromagnetic drive coil arrangement is configured to provide a first drive sequence when a first portion of the shared driving and sensing element is located near the drive coil arrangement, and to provide a second drive sequence when the first portion of the shared driving and sensing element is located near the gap. Additionally or alternatively to one or more of the examples disclosed above, in some examples, the first portion of the shared driving and sensing element corresponds to a location a magnet included in the shared driving and sensing element. Additionally or alternatively to one or more of the examples disclosed above, in some examples, the mechanical input sensor comprises an optical sensor configured to sense the rotation of the mechanical input by sensing movement of a pattern disposed on the shared driving and sensing element through the gap, and at least a portion of the pattern disposed on the shared driving and sensing element corresponds to a location of a magnet included in the shared driving and sensing element. Additionally or alternatively to one or more of the examples disclosed above, in some examples, the mechanical input is further configured to translate along the rotation axis in response to a second input, and the mechanical input actuator comprises at least one piezoelectric element configured to: allow the mechanical input to translate along the rotation axis, and rotate the mechanical input in the second direction about the rotation axis. Additionally or alternatively to one or more of the examples disclosed above, in some examples, the mechanical input actuator is further configured to deflect in response to the second input to allow for activation of a translational input. Additionally or alternatively to one or more of the examples disclosed above, in some examples, the at least one piezoelectric element is coupled to a stator disc configured for providing a voltage to the at least one piezoelectric element, the stator disc is coupled to a housing of the electronic device, and the mechanical input comprises a rotor disc coupled to a shaft and the shaft is configured to pass through an opening in the housing of the electronic device. Additionally or alternatively to one or more of the examples disclosed above, in some examples, the at least one piezoelectric element resists rotation of the mechanical input about the rotation axis by increasing an amount of friction acting against rotation of the mechanical input about the rotation axis.

Some examples of the disclosure are directed to a non-transitory computer readable storage medium having stored thereon a set of instructions, that when executed by a processor causes the processor to: sense a rotation of a mechanical input in a first direction about a rotation axis resulting from an input at the mechanical input; and rotate the mechanical input in a second direction about the rotation axis. Additionally or alternatively to one or more of the examples disclosed above, in some examples, sensing the rotation of the mechanical input comprises sensing the rotation of the mechanical input about the rotation axis at a shared driving and sensing segment of the mechanical input; and rotating the mechanical input in the second direction about the rotation axis comprises generating magnetic fields at the shared driving and sensing segment for rotating the mechanical input. Additionally or alternatively to one or more of the examples disclosed above, in some examples, the mechanical input is configured to translate along the rotation axis in response to a second input, and the instructions further cause the processor to: rotate the mechanical input in the second direction about the rotation axis using at least one piezoelectric element, the at least one piezoelectric element configured to allow the mechanical input to translate along the rotation axis.

Some examples of the disclosure are directed to a method comprising the steps of: sensing a rotation of a mechanical input in a first direction about a rotation axis resulting from an input at the mechanical input, and rotating the mechanical input in a second direction about the rotation axis. Additionally or alternatively to one or more of the examples disclosed above, in some examples, sensing the rotation of the mechanical input comprises sensing the rotation of the mechanical input about the rotation axis at a shared driving and sensing segment of the mechanical input; and rotating the mechanical input in the second direction about the rotation axis comprises generating magnetic fields at the shared driving and sensing segment for rotating the mechanical input. Additionally or alternatively to one or more of the examples disclosed above, in some examples, the method further comprises rotating the mechanical input in the second direction about the rotation axis using at least one piezoelectric element, the at least one piezoelectric element configured to allow the mechanical input to translate along the rotation axis, wherein the mechanical input is configured to translate along the rotation axis in response to a second input.

Some examples of the disclosure are directed to an electronic device comprising: a mechanical input configured to receive input from a user and move in a first direction; a mechanical input sensor coupled to the mechanical input and configured to sense a movement of the mechanical input in the first direction; and a processor capable of determining whether the sensed movement of the mechanical input is consistent with the user contacting the mechanical input without identifying the sensed movement as a user input to the electronic device. Additionally or alternatively to one or more of the examples disclosed above, in some examples, determining whether the sensed movement is consistent with the user contacting the mechanical input comprises determining whether the sensed movement corresponds to a micro-tremor of a finger. Additionally or alternatively to one or more of the examples disclosed above, in some examples, the electronic device further comprises a mechanical input actuator coupled to the mechanical input and configured to provide a micro-oscillation to the mechanical input. Additionally or alternatively to one or more of the examples disclosed above, in some examples, determining whether the sensed movement is consistent with the user contacting the mechanical input comprises detecting an interaction between the micro-oscillation and a micro-tremor of a finger.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An electronic device comprising:
    a mechanical input configured to rotate in a first direction about a rotation axis in response to a first input at the mechanical input;
    an actuator coupled to the mechanical input and configured to generate magnetic fields for rotating the mechanical input in a second direction about the rotation axis,
    a mechanical input sensor coupled to the mechanical input and configured to sense a rotation of the mechanical input about the rotation axis, wherein sensing the rotation of the mechanical input at the mechanical input sensor occurs through a gap in a drive coil arrangement disposed around the mechanical input; and
    wherein a drive pattern for generating magnetic fields in the drive coil arrangement is configured to provide a first drive sequence when a first portion of the mechanical input is located near the drive coil arrangement, and to provide a second drive sequence when the first portion of the mechanical input is located near the gap.

2. The electronic device of claim 1, wherein the mechanical input comprises a shared driving and sensing element and the shared driving and sensing segment includes at least one magnet.

3. The electronic device of claim 1, wherein the first portion of the mechanical input corresponds to a location of a magnet included in the mechanical input.

4. The electronic device of claim 1, wherein:
    the mechanical input sensor comprises an optical sensor configured to sense the rotation of the mechanical input by sensing movement of a pattern disposed on the shared driving and sensing element through the gap, and at least a portion of the pattern disposed on the shared driving and sensing element corresponds to a location of a magnet included in the shared driving and sensing element.

5. The electronic device of claim 1, wherein the mechanical input is configured to translate along the rotation axis in response to a second input.

6. A non-transitory computer readable storage medium having stored thereon a set of instructions, that when executed by a processor causes the processor to:
    sense a rotation of a mechanical input in a first direction about a rotation axis resulting from an input at the mechanical input, wherein sensing the rotation occurs through a gap in a drive coil arrangement disposed around the mechanical input; and
    rotate the mechanical input in a second direction about the rotation axis by providing a first drive sequence for generating magnetic fields in the drive coil arrangement when a first portion of the mechanical input is located near the drive coil arrangement and providing a second drive sequence when the first portion of the mechanical input is located near the gap.

7. The non-transitory computer readable storage medium of claim 6, wherein:
    the mechanical input comprises a shared driving and sensing element and the shared driving and sensing element includes at least one magnet.

8. The non-transitory computer readable storage medium of claim 6, wherein the mechanical input is configured to translate along the rotation axis in response to a second input.

9. The non-transitory computer readable storage medium of claim 6, wherein the first portion of the mechanical input corresponds to a location of a magnet included in the mechanical input.

10. The non-transitory computer readable storage medium of claim 6, wherein:
the mechanical input sensor comprises an optical sensor configured to sense the rotation of the mechanical input by sensing movement of a pattern disposed on the shared driving and sensing element through the gap, and at least a portion of the pattern disposed on the shared driving and sensing element corresponds to a location of a magnet included in the shared driving and sensing element.

11. A method comprising the steps of:
sensing a rotation of a mechanical input in a first direction about a rotation axis resulting from an input at the mechanical input, wherein sensing the rotation occurs through a gap in a drive coil arrangement disposed around the mechanical input; and
rotating the mechanical input in a second direction about the rotation axis by providing a first drive sequence for generating magnetic fields in the drive coil arrangement when a first portion of the mechanical input is located near the drive coil arrangement and providing a second drive sequence when the first portion of the mechanical input is located near the gap.

12. The method of claim 11, wherein:
the mechanical input comprises a shared driving and sensing element and the shared driving and sensing element includes at least one magnet.

13. The method of claim 11, wherein the mechanical input is configured to translate along the rotation axis in response to a second input.

14. The method of claim 11, wherein the first portion of the mechanical input corresponds to a location of a magnet included in the mechanical input.

15. The method of claim 11, wherein:
the mechanical input sensor comprises an optical sensor configured to sense the rotation of the mechanical input by sensing movement of a pattern disposed on the shared driving and sensing element through the gap, and at least a portion of the pattern disposed on the shared driving and sensing element corresponds to a location of a magnet included in the shared driving and sensing element.

* * * * *